United States Patent
Miyasaka et al.

(10) Patent No.: US 10,569,428 B2
(45) Date of Patent: Feb. 25, 2020

(54) ROBOT

(71) Applicant: Seiko Epson Corporation, Tokyo (JP)

(72) Inventors: Hidekatsu Miyasaka, Matsumoto (JP); Sho Nakano, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/975,039

(22) Filed: May 9, 2018

(65) Prior Publication Data

US 2018/0326598 A1    Nov. 15, 2018

(30) Foreign Application Priority Data

May 11, 2017   (JP) .................................. 2017/094938

(51) Int. Cl.
  *B25J 18/04*   (2006.01)
  *B25J 9/04*    (2006.01)
  *B25J 18/00*   (2006.01)
  *B25J 9/00*    (2006.01)

(52) U.S. Cl.
  CPC .............. *B25J 18/04* (2013.01); *B25J 9/046* (2013.01); *B25J 18/007* (2013.01); *B25J 9/0009* (2013.01)

(58) Field of Classification Search
  CPC ..... B25J 9/046; B25J 9/06; B25J 9/047; B25J 18/04; Y10S 901/15
  See application file for complete search history.

(56) References Cited

U.S. PATENT DOCUMENTS

| | | | | |
|---|---|---|---|---|
| 5,115,690 A | * | 5/1992 | Torii | B25J 9/047 74/490.02 |
| 5,305,652 A | * | 4/1994 | Zimmer | B25J 9/047 74/490.01 |
| 7,594,912 B2 | * | 9/2009 | Cooper | A61B 34/30 606/1 |
| 7,971,504 B2 | * | 7/2011 | Haniya | B25J 9/0087 74/490.03 |
| 8,062,288 B2 | * | 11/2011 | Cooper | A61B 34/30 606/1 |

(Continued)

FOREIGN PATENT DOCUMENTS

| JP | 2016-068226 A | 5/2016 |
|---|---|---|
| JP | 2016-190293 A | 11/2016 |

(Continued)

*Primary Examiner* — Jake Cook
*Assistant Examiner* — Bobby Rushing, Jr.
(74) *Attorney, Agent, or Firm* — Harness, Dickey & Pierce, P.L.C.

(57) ABSTRACT

A robot includes: an n-th arm (where n is at least one integer equal to or greater than 1) that includes a first portion and a second portion having a portion extending in a different direction from the first portion and is rotatable around an n-th rotation axis; and an (n+1)-th arm that is installed in the n-th arm to be rotatable around an (n+1)-th rotation axis as a different axis direction from a axis direction of the n-th rotation axis. The second portion is located closer to the (n+1)-th arm than the first portion. The n-th arm and the (n+1)-th arm are overlapable when viewed in the axis direction of the (n+1)-th rotation axis. The n-th rotation axis and the (n+1)-th rotation axis are separate from each other. A length of the (n+1)-th arm is equal to or less than 80% of a length of the second portion.

7 Claims, 15 Drawing Sheets

(56) References Cited

U.S. PATENT DOCUMENTS

| | | | |
|---|---|---|---|
| 8,763,489 B2* | 7/2014 | Kirihara | B25J 9/0027 74/490.01 |
| 2003/0180135 A1* | 9/2003 | Sawdon | B25J 9/06 414/730 |
| 2003/0221504 A1 | 12/2003 | Stoianovici et al. | |
| 2012/0321426 A1* | 12/2012 | Tanaka | H01L 21/67766 414/728 |
| 2015/0251322 A1* | 9/2015 | Goodwin | B25J 11/008 74/490.03 |
| 2016/0288335 A1 | 10/2016 | Akaha et al. | |
| 2016/0288336 A1 | 10/2016 | Toshimitsu et al. | |
| 2016/0311107 A1 | 10/2016 | Yoshimura et al. | |
| 2016/0318180 A1 | 11/2016 | Miyasaka | |
| 2017/0225326 A1 | 8/2017 | Akaha et al. | |
| 2017/0291297 A1 | 10/2017 | Miyasaka | |

FOREIGN PATENT DOCUMENTS

| | | |
|---|---|---|
| JP | 2016-190298 A | 11/2016 |
| JP | 2016-203332 A | 12/2016 |
| JP | 2016-203344 A | 12/2016 |
| JP | 2017-080857 A | 5/2017 |
| JP | 2017-185594 A | 10/2017 |

* cited by examiner

ROBOT

BACKGROUND

1. Technical Field

The present invention relates to a robot.

2. Related Art

In the related art, robots including robot arms are known. In the robot arms, a plurality of arms are connected via joints and, for example, hands are mounted as end effectors on arms on the most distal end side. The joints are driven by motors and arms are rotated through the driving of the joints. Then, the robots perform predetermined work such as assembling, for example, by causing the hands to hold objects to move the objects to predetermined locations.

As such robots, a vertically articulated robot is disclosed in JP-A-2016-68226. In the robot disclosed in JP-A-2016-68226, a first arm includes a first portion and a second portion intersecting the first portion, and a base is fixed to a ceiling. Then, the robot is configured such that the first, second, and third arms overlap each other when viewed in a axis direction of a second rotation axis. In the robot, by rotating the second and third arms without rotating the first arm, the hand can be moved to a position different by 180° around a first rotation axis via a state in which the first, second, and third arms overlap each other when viewed in a axis direction of the second rotation axis.

However, in a case in which the base is fixed to or placed (installed) on a lower portion (surface) of a floor or a working table in the vertical direction in the robot disclosed in JP-A-2016-68226, a rear portion of the third arm of the robot arm or the hand interferes in the first portion of the first arm when the hand of the robot attempts to move to the side of the floor or the working table, that is, the side of the surface on which the robot is installed (an installation surface).

SUMMARY

An advantage of some aspects of the invention is to solve at least a part of the problems described above, and the invention can be implemented as the following forms or application examples.

A robot according to an aspect of the invention includes: an n-th arm (where n is at least one integer equal to or greater than 1) that includes a first portion and a second portion having a portion extending in a different direction from the first portion and is rotatable around an n-th rotation axis; and an (n+1)-th arm that is installed in the n-th arm to be rotatable around an (n+1)-th rotation axis as a different axis direction from a axis direction of the n-th rotation axis. The n-th arm and the (n+1)-th arm are overlapable when viewed in the axis direction of the (n+1)-th rotation axis. The n-th rotation axis and the (n+1)-th rotation axis are separate from each other when viewed in the axis direction of the (n+1)-th rotation axis. The second portion is located closer to the (n+1)-th arm than the first portion. A length of the (n+1)-th arm is equal to or less than 80% of a length of the second portion when viewed in the axis direction of the (n+1)-th rotation axis.

According to the aspect of the invention, it is possible to easily access a side of the robot and an installation surface side of the robot. It is possible to suppress interference of the arm on the distal end side from the (n+1)-th arm of the robot arm or an end effector in the first portion of the n-th arm. It is possible to efficiently perform various kinds of work.

In the robot according to the aspect of the invention, it is preferable that the length of the (n+1)-th arm is equal to or greater than 60% of the length of the second portion when viewed in the axis direction of the (n+1)-th rotation axis.

With this configuration, a reach range of the robot arm is narrowed, and thus it is possible to suppress difficulty of access to the installation surface side of the robot.

In the robot according to the aspect of the invention, it is preferable that at a basic orientation of the (n+1)-th arm, a distance between the n-th rotation axis and a base end of the (n+1)-th arm is equal to or greater than 35% and equal or less than 45% of the length of the second portion when viewed in the axis direction of the (n+1)-th rotation axis.

With this configuration, it is possible to easily access the side of the robot and the installation surface side of the robot.

In the robot according to the aspect of the invention, it is preferable that at a basic orientation of the (n+1)-th arm, the (n+1)-th arm intersects the n-th rotation axis when viewed in the axis direction of the (n+1)-th rotation axis.

With this configuration, when the (n+1)-th arm rotates in a forward direction and a backward direction centering on a basic orientation, for example, it is possible to quickly perform work between the side surface and the installation surface of the robot such as between the side surface and a floor.

In the robot according to the aspect of the invention, it is preferable that a basic orientation of the (n+1)-th arm is changeable.

With this configuration, it is possible to change a range in which the distal end of the robot arm can move quickly, and thus it is possible to deal with various uses.

In the robot according to the aspect of the invention, it is preferable that the first portion is sloped to the second rotation axis when viewed in the axis direction of the n-th rotation axis.

With this configuration, the n-th rotation axis and the (n+1)-th rotation axis can be separate from each other when viewed in the axis direction of the (n+1)-th rotation axis. It is possible to improve rigidity of the n-th arm. That is, it is possible to reduce dimensions (weight) of the n-th arm with regard to necessary and sufficient rigidity of the n-th arm.

In the robot according to the aspect of the invention, it is preferable that a first width of a portion of the second portion on a side opposite to the first portion is greater than a second width of a portion of the second portion on a side of the first portion when viewed in the axis direction of the (n+1)-th rotation axis.

With this configuration, it is possible to pass a cable (not illustrated) through the n-th arm in the direction of a straight line passing through the (n+1)-th rotation axis and an (n+2)-th rotation axis.

In the robot according to the aspect of the invention, it is preferable that the (n+1)-th rotation axis is located on a side (separation side) on which the (n+1)-th rotation axis is separate from the n-th rotation axis from a central position of the first width of the second portion when viewed in the axis direction of the (n+1)-th rotation axis.

With this configuration, it is possible to easily access the side of the robot and the installation surface side of the robot.

In the robot according to the aspect of the invention, it is preferable that n is 1.

With this configuration, the length of the second arm is equal to or less than 80% of the length of the second portion of the first arm. Thus, it is possible to suppress interference of the arm on the distal end side from the second arm of the robot arm or the end effector in the first portion of the first arm.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot according to the invention will be described in detail with reference to the appended drawings according to embodiments.

Figure 1:
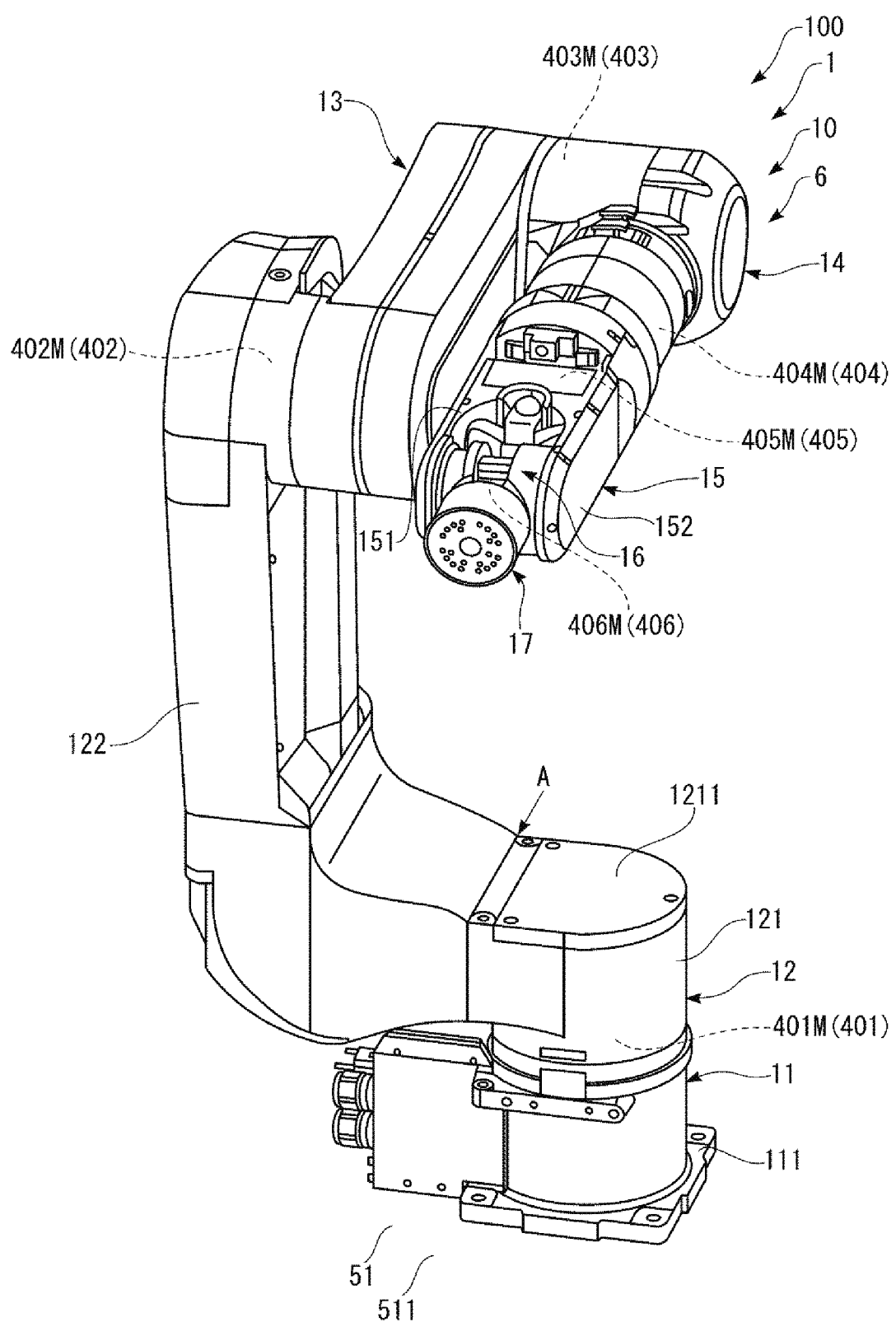
FIG. 1 is a perspective view illustrating a first embodiment of a robot (robot system) according to the invention.
Figure 2:
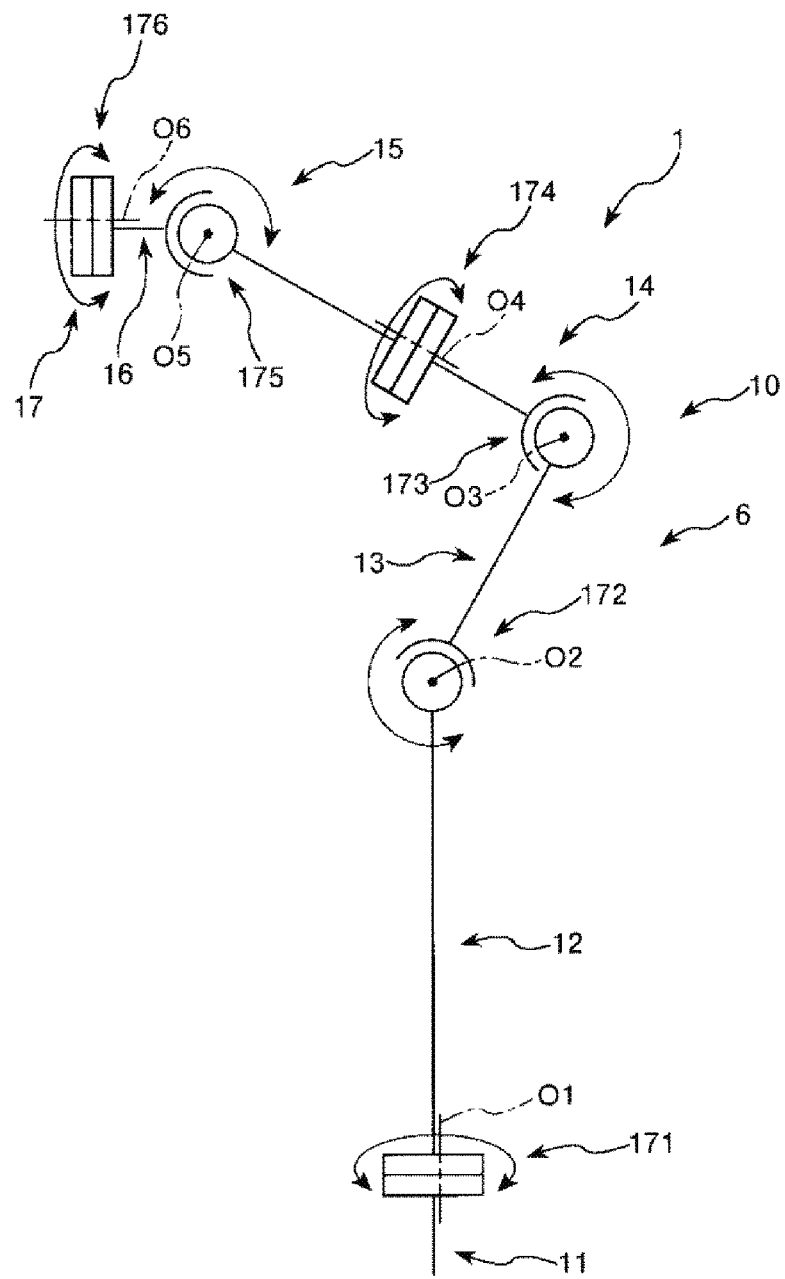
FIG. 2 is a schematic view illustrating the robot illustrated in FIG. 1.
Figure 3:
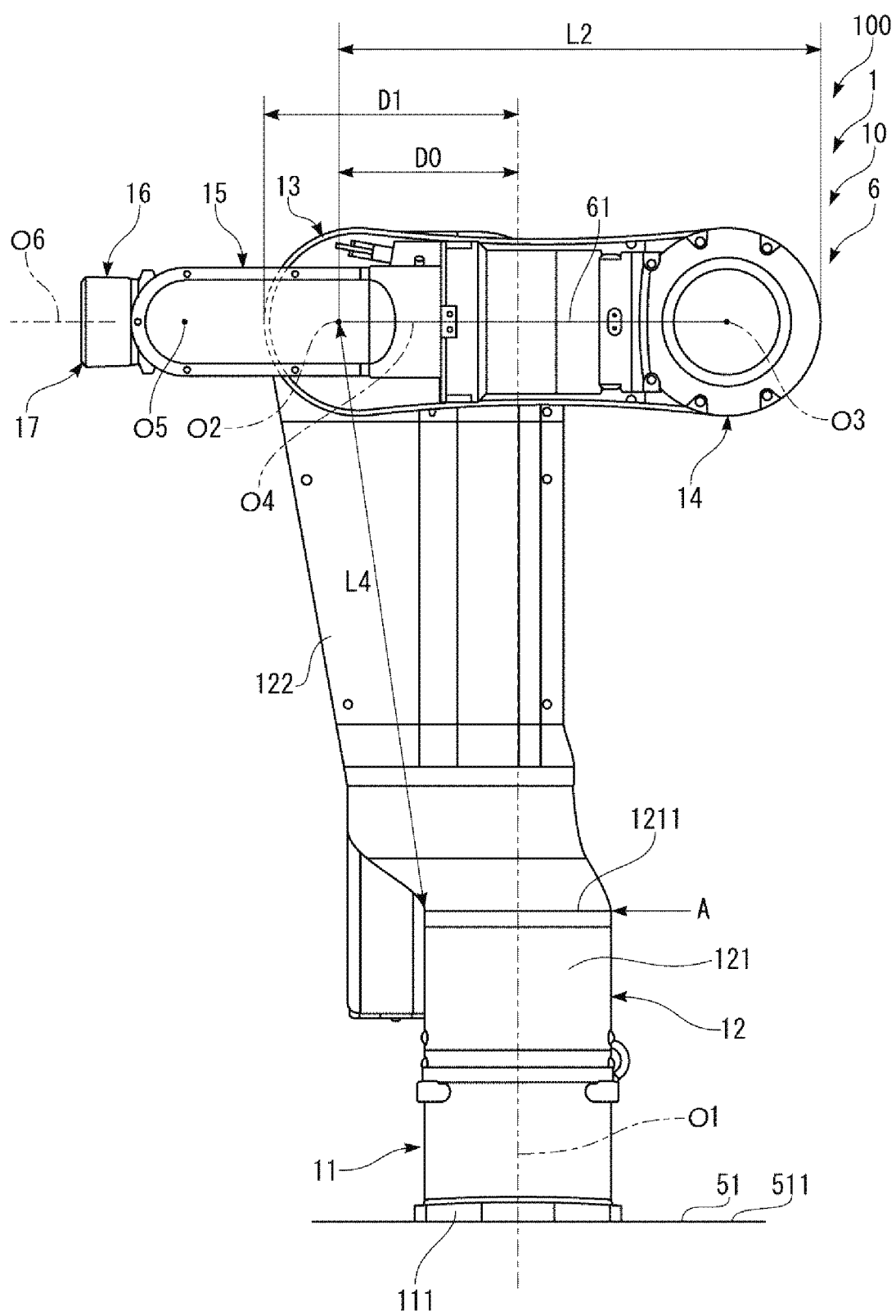
FIG. 3 is a front view illustrating the robot illustrated in FIG. 1.
Figure 4:
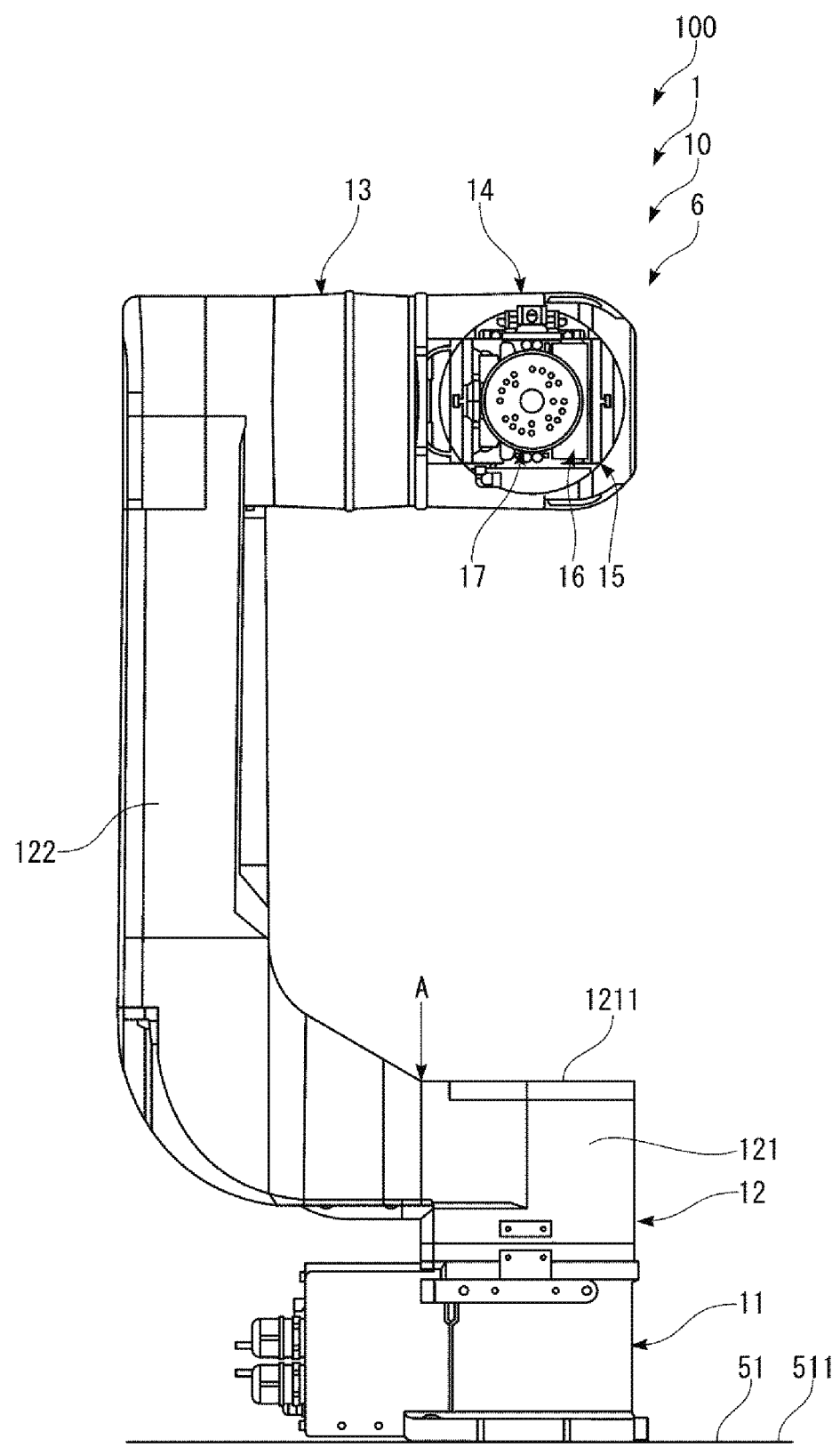
FIG. 4 is a side view illustrating the robot illustrated in FIG. 1.
Figure 5:
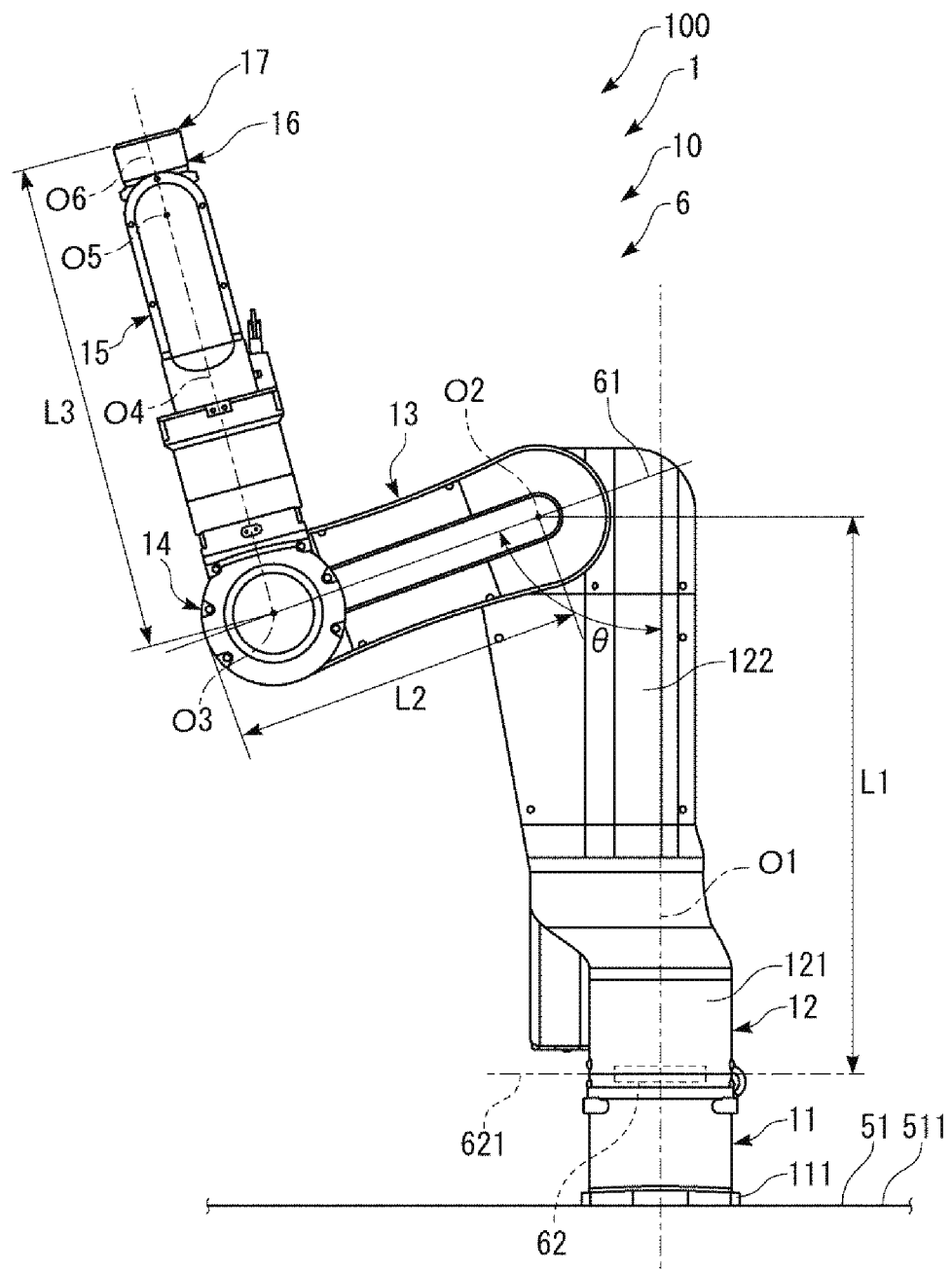
FIG. 5 is a front view illustrating the robot illustrated in FIG. 1.
Figure 6:
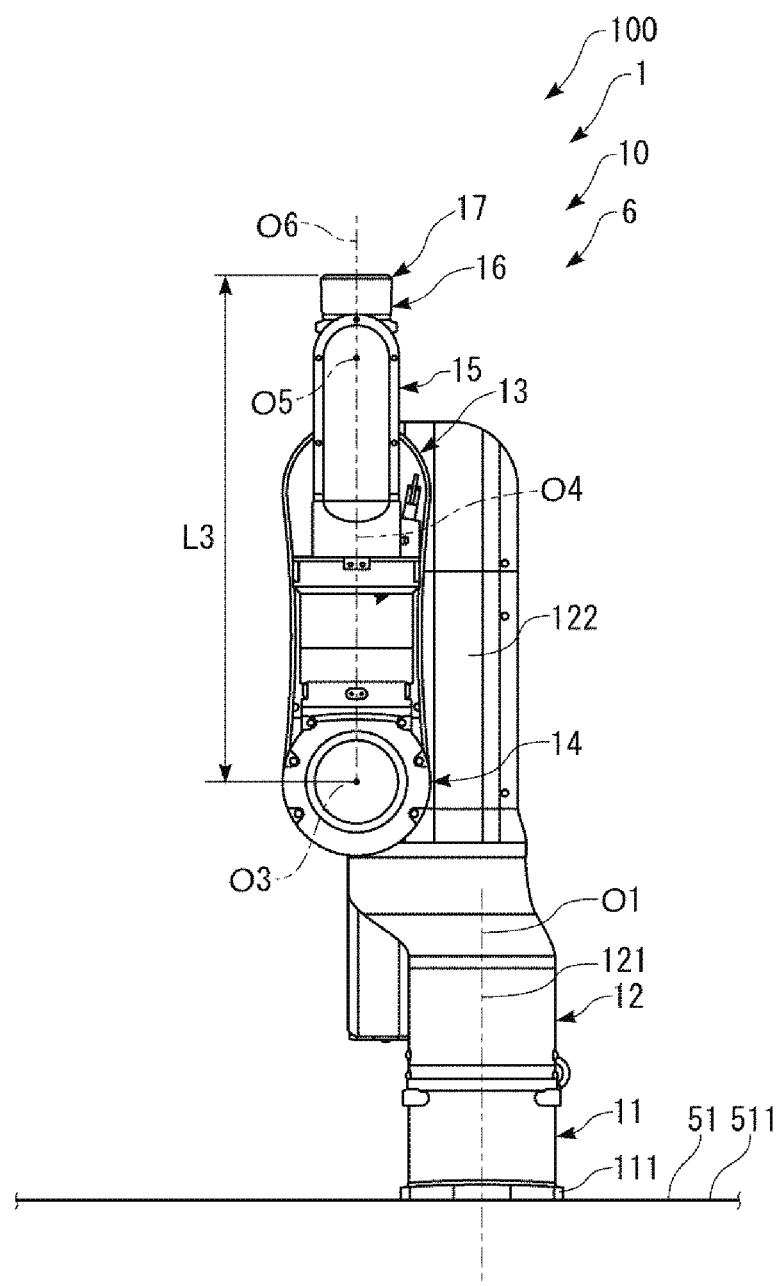
FIG. 6 is a front view illustrating the robot illustrated in FIG. 1.
Figure 7:
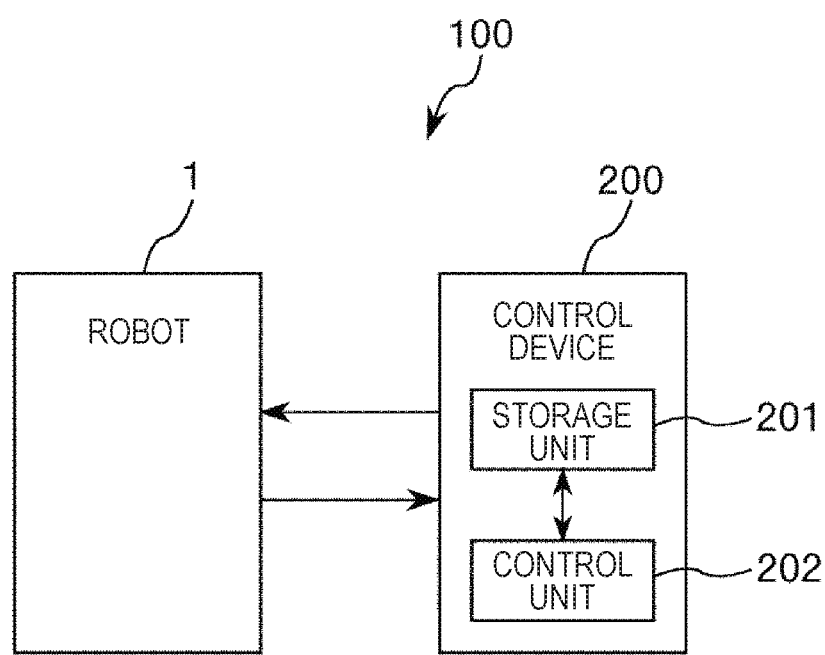
FIG. 7 is a block diagram illustrating the robot (robot system) illustrated in FIG. 1.
Figure 8:
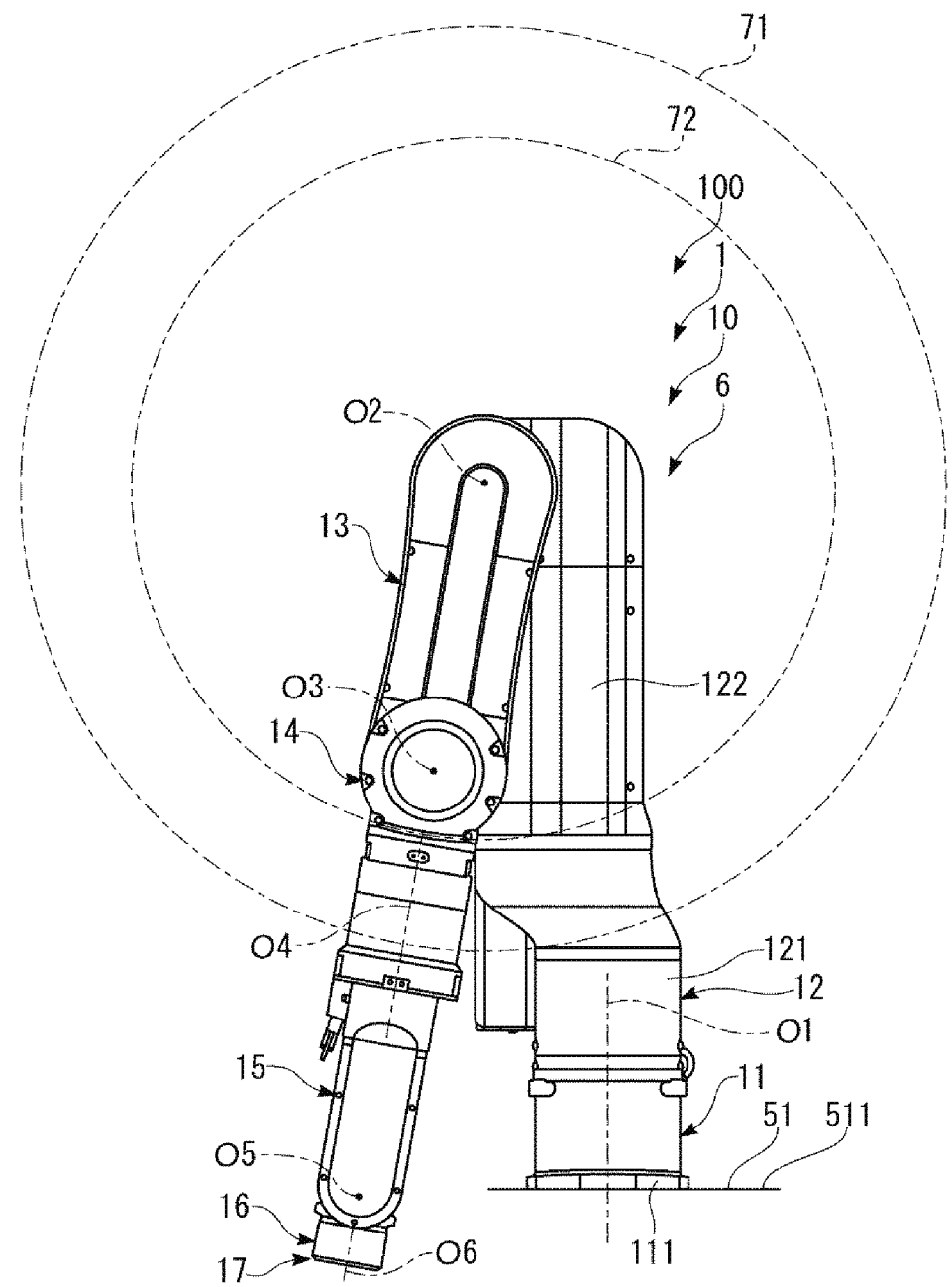
FIG. 8 is a diagram (front view) illustrating an operation of the robot illustrated in FIG. 1.
Figure 9:
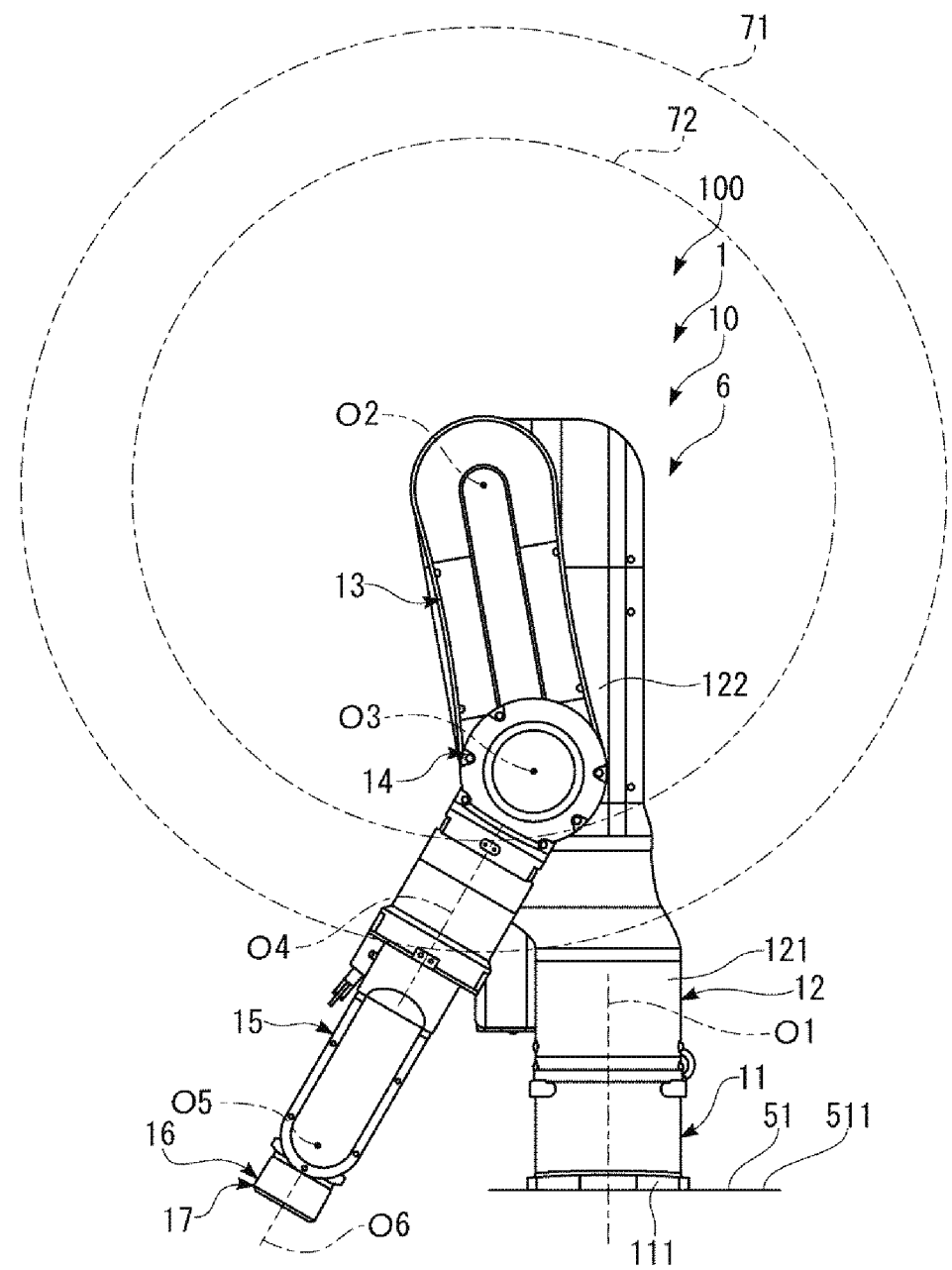
FIG. 9 is a diagram (front view) illustrating an operation of the robot illustrated in FIG. 1.
Figure 10:
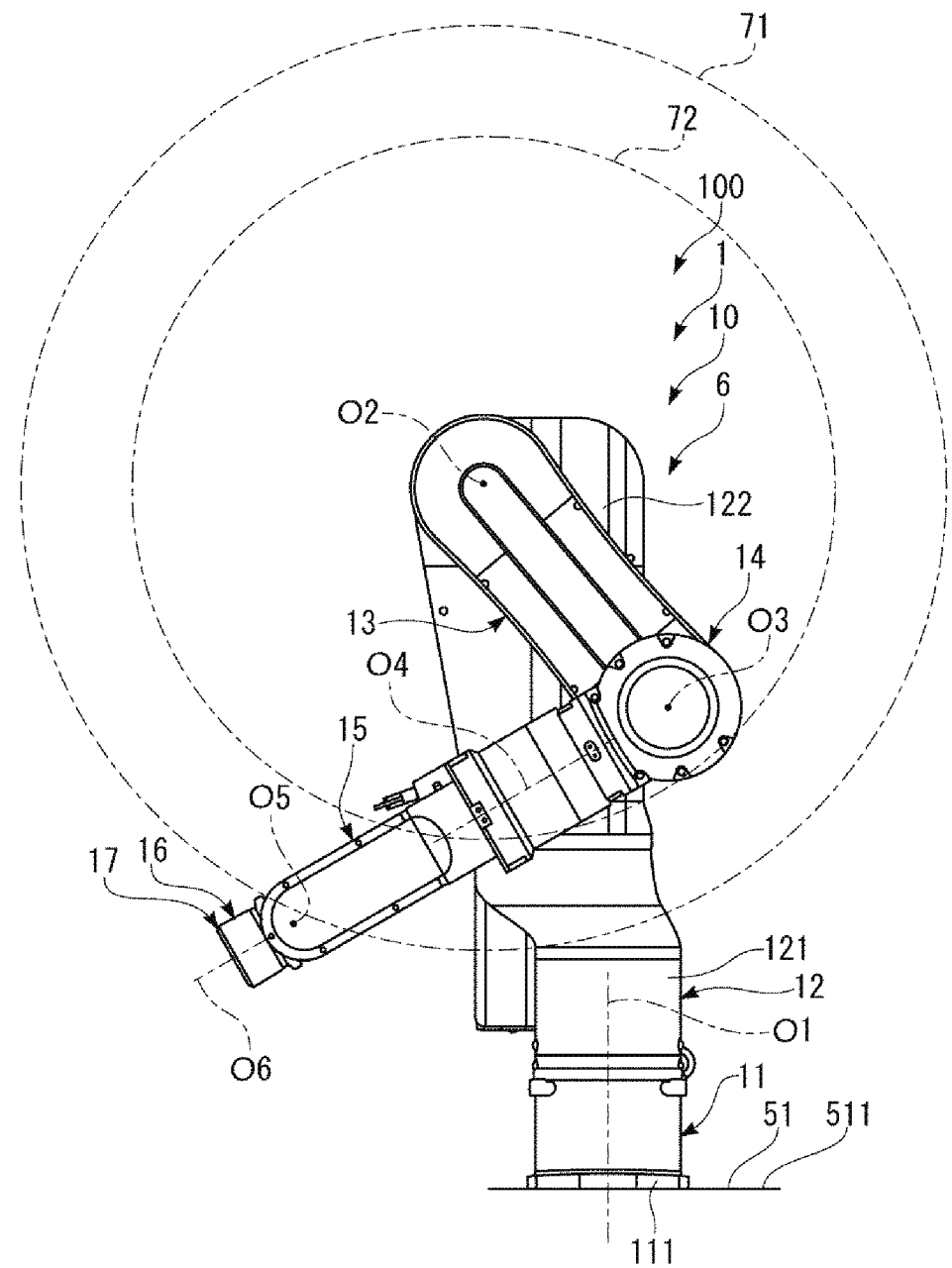
FIG. 10 is a diagram (front view) illustrating an operation of the robot illustrated in FIG. 1.

In the following embodiments, a case in which n defined in SUMMARY is 1 will be exemplified in the description, but n may be at least one integer equal to or greater than 1.
First Embodiment FIG. 1 is a perspective view illustrating a first embodiment of a robot (robot system) according to the invention. FIG. 2 is a schematic view illustrating the robot illustrated in FIG. 1. FIG. 3 is a front view illustrating the robot illustrated in FIG. 1. FIG. 4 is a side view illustrating the robot illustrated in FIG. 1. FIGS. 5 and 6 are front views illustrating the robot illustrated in FIG. 1. FIG. 7 is a block diagram illustrating the robot (robot system) illustrated in FIG. 1. FIGS. 8 to 10 are diagrams (front views) illustrating an operation of the robot illustrated in FIG. 1.

Hereinafter, to facilitate the description, the upper side is referred to as a "top" or an "upward side" and the lower side in FIGS. 1 to 6 and 8 to 10 is referred to as a "bottom" or a "downward side". In FIGS. 1 to 6 and 8 to 10, a base side is referred to as a "base end" or an "upstream side" and its opposite side is referred to as a "distal end" or a "downstream side". In FIGS. 1 to 6 and 8 to 10, upper and lower directions are referred to as a "vertical direction" and right and left directions are referred to as a "horizontal direction".

In the present specification, "horizontal" includes not only a completely horizontal case but also a case sloped within ±5° with respect to the horizontal direction. Similarly, in the present specification, "vertical" includes not only a completely vertical case but also a case sloped within ±5° with respect to the vertical direction. In the present specification, "parallel" includes not only a case in which two lines (including axes) or surfaces are completely parallel to each other but also a case in which an angle formed by one of the lines or surfaces and the other is within ±5°. In the present specification, "orthogonal" includes not only a case in which two lines (including axes) or surfaces are completely orthogonal to each other but also a case in which an angle formed by one of the lines or surfaces and the other is within ±5°. The same applies to the drawings of other embodiments.

First, an overview of a robot 1 will be described to correspond to the appended claims and will be subsequently described specifically.

As illustrated in FIGS. 1 to 3, the robot 1 includes a first arm 12 (n-th arm) that includes a first portion 121 and a second portion 122 having a portion extending in a direction different from the first portion 121 and is rotatable around a first rotation axis O1 (n-th rotation axis) and a second arm 13 ((n+1)-th arm) that is installed in the first arm 12 (n-th arm) to be rotatable around a second rotation axis O2 ((n+1)-th rotation axis) as a different axis direction (in the embodiment, a direction orthogonal to) from the axis direction of the first rotation axis O1 (n-th rotation axis). The second portion 122 is located closer to the second arm 13 ((n+1)-th arm) than the first portion 121. Here, n is at least one integer equal to or greater than 1. In the embodiment, n is 1.

In the robot 1, the first arm 12 (n-th arm) and the second arm 13 ((n+1)-th arm) can overlap each other when viewed in a axis direction of the second rotation axis O2 ((n+1)-th rotation axis).

The first rotation axis O1 (n-th rotation axis) and the second rotation axis O2 ((n+1)-th rotation axis) are separate from each other when viewed in the axis direction of the second rotation axis O2 ((n+1)-th rotation axis).

A length L2 of the second arm 13 ((n+1)-th arm) is equal to or less than 80% of a length L4 of the second portion 122 of the first arm 12 when viewed in the axis direction of the second rotation axis O2 ((n+1)-th rotation axis). As illustrated in FIG. 3, the length L2 of the second arm 13 is a distance between the second rotation axis O2 and the distal end of the second arm 13 when viewed in the axis direction of the second rotation axis O2. The length L4 of the second portion 122 of the first arm 12 is a distance between a boundary A of the first portion 121 and the second portion 122, that is, the boundary A between the second portion 122 and a planar portion 1211 of the first portion 121, and the second rotation axis O2, as illustrated in FIG. 3 when viewed in the axis direction of the second rotation axis O2. The length L4 of the second portion 122 can be said to be a distance between the planar portion 1211 and the second rotation axis O2 when viewed in the axis direction of the second rotation axis O2. The boundary A is a portion starting to be sloped from the planar portion 1211 of the first arm 12 (the second portion 122).

In the robot 1, it is possible to easily access a side of the robot 1 and an installation surface side of the robot 1. It is possible to suppress interference of a third arm 14 to a sixth arm 17 which are arms on a distal end side from the second arm 13 of a robot arm 6 or an end effector (not illustrated) such as a hand in the first portion 121 of the first arm 12. It is possible to efficiently perform various kinds of work. Hereinafter, specific description will be made.

As illustrated in FIGS. 1 to 3 and 7, a robot system 100 (an industrial robot system) includes the robot (an industrial robot) and a control device 200 (a robot control device) controlling the robot 1. The robot system 100 can be used for a manufacturing step or the like of manufacturing, for example, a precision device such as a wristwatch. The robot system 100 can perform each work such as material supply, material removal, transport, and assembly of the precision device or components included in the precision device. In the invention, the robot 1 may include the control device 200.

The control device 200 includes a control unit 202 that performs each control and a storage unit 201 that stores each piece of information. The control device 200 can include a personal computer (PC) containing a central processing unit (CPU: not illustrated) and the like and controls each unit such as a first motor 401M, a second motor 402M, a third motor 403M, a fourth motor 404M, a fifth motor 405M, a sixth motor 406M, and an end effector of the robot 1 to be described below. A program controlling the robot 1 is stored in advance in the storage unit 201.

The control device 200 may be partially or entirely contained in the robot 1 (a robot body 10) or may be separate from the robot 1. When the robot 1 and the control device 200 are separate from each other, for example, the robot 1 and the control device 200 may be electrically connected to each other by a cable (not illustrated) to perform communication in conformity to a wired scheme or perform communication in conformity to a wireless scheme by omitting the cable.

The robot 1 includes the robot body 10, a first driving source 401, a second driving source 402, a third driving source 403, a fourth driving source 404, a fifth driving source 405, and a sixth driving source 406. The robot body 10 includes a base (support portion) 11 and the robot arm 6.

The robot arm 6 includes the first arm 12 that is installed in the base 11 to be rotatable around the first rotation axis O1, the second arm 13 that is installed in the first arm 12 to be rotatable around the second rotation axis O2 as the axis direction different from (in the embodiment, orthogonal to) a axis direction of the first rotation axis O1, the third arm 14 that is installed in the second arm 13 to be rotatable around a third rotation axis O3, the fourth arm 15 that is installed in the third arm 14 to be rotatable around a fourth rotation axis O4, the fifth arm 16 that is installed in the fourth arm 15 to be rotatable around a fifth rotation axis O5, and the sixth arm 17 that is installed in the fifth arm 16 to be rotatable around a sixth rotation axis O6. A list is formed by the fifth arm 16 and the sixth arm 17 and, for example, the end effector such as a hand can be detachably mounted on a distal end of the sixth arm 17 (a distal end of the robot arm 6). Hereinafter, the robot 1 will be described in detail.

A kind of robot 1 is not particularly limited. In the embodiment, the robot 1 is a vertically articulated (six-axis) robot in which the base 11, the first arm 12, the second arm 13, the third arm 14, the fourth arm 15, the fifth arm 16, the sixth arm 17 are connected in this order from a base end side to a distal end side. The "vertically articulated robot" refers to a robot in which the number of rotation axes (the number of arms) is 2 or more and two rotation axes of the rotation axes of the robot intersect (are orthogonal to) each other. Hereinafter, the first arm 12, the second arm 13, the third arm 14, the fourth arm 15, the fifth arm 16, and the sixth arm 17 are also referred to as "arms". The first driving source 401, the second driving source 402, the third driving source 403, the fourth driving source 404, the fifth driving source 405, and the sixth driving source 406 are each also referred to as "driving sources".

As illustrated in FIG. 3, the base 11 is a portion (mounting member) fixed (supported) to a predetermined portion of an installation space. The fixing method is not particularly limited. For example, a fixing method using a plurality of bolts can be adopted.

In the embodiment, the base 11 is fixed to a floor surface 511 of a floor 51 (floor portion) of the installation space. The floor surface 511 is a flat surface parallel to a horizontal surface. A plate-shaped flange 111 installed at the distal end of the base 11 is mounted on the floor surface 511 and the mounting place of the floor surface 511 of the base 11 is not limited thereto.

The base 11 may include or may not include a joint 171 to be described below (see FIG. 2).

The first arm 12, the second arm 13, the third arm 14, the fourth arm 15, the fifth arm 16, and the sixth arm are supported to be displaceable independently with respect to the base 11.

As illustrated in FIGS. 1 and 3, the first arm 12 has a curvature shape. That is, when described in the state of FIGS. 1 and 3, the first arm 12 includes the first portion 121 that is connected (installed) to the base 11 and extends from the base 11 in the axis direction (the vertical direction) of the first rotation axis O1 to be described below and on the upper side in FIG. 1 and the second portion 122 that extends from the side of the first portion 121 in FIG. 1 to the left in FIG. 1 in the axis direction (the horizontal direction) of the second rotation axis O2, is bent halfway at 90°, and extends in the axis direction (the vertical direction) of the first rotation axis O1 and on the upper side in FIG. 1. In the embodiment, a portion of the second portion 122 extending from the side of the first portion 121 to the left side in FIG. 1 is slightly sloped on the upper side in FIG. 1 from the completed horizontal direction. The first portion 121 includes the flat planar portion 1211 on the upper side in FIG. 1. The first portion 121 and the second portion 122 are integrated. The boundary A of the first portion 121 and the second portion 122 is illustrated in the drawings.

The second arm 13 is formed in an elongated shape and is connected (installed) to the distal end of the first arm 12, that is, the distal end of the second portion 122.

The third arm 14 is formed in an elongated shape and is connected (installed) to the distal end of the second arm 13.

The fourth arm 15 is connected (installed) to the distal end of the third arm 14. The fourth arm 15 includes a pair of support portions 151 and 152 facing each other. The support portions 151 and 152 are used to connect the fourth arm 15 to the fifth arm 16.

The fifth arm 16 is located between the support portions 151 and 152 and is connected to the support portions 151 and 152 to be connected to the fourth arm 15 (is installed in the fourth arm 15). The fourth arm 15 is not limited to this structure. For example, the number of support portions is 1 (a cantilever).

The sixth arm 17 is connected (installed) to the distal end of the fifth arm 16. For example, a hand caused to hold a precision device such as a wristwatch, a component, or the like can be detachably mounted as an end effector on the distal end of the sixth arm 17 (the end opposite to the fifth arm 16). Driving of the hand is controlled by the control device 200. The hand is not particularly limited. For example, a plurality of fingers can be exemplified. The robot 1 can perform each work by controlling operations of the arms 12 to 17 and the like with the hand caused to hold a precision device, a component, or the like and transporting the precision device, the component, or the like.

As illustrated in FIGS. 1 to 3, the first arm 12 is installed in the base 11. Thus, when the robot 1 is installed, installation work can be easily performed by installing the base 11.

Specifically, the base 11 and the first arm 12 are connected to each other via a joint 171. The joint 171 includes a mechanism that supports the first arm 12 to be rotatable with respect to the base 11. Thus, the first arm 12 is rotatable about the first rotation axis O1 (around the first rotation axis O1) extending in (following) the vertical direction with respect to the base 11. The first rotation axis O1 matches a normal line of the floor surface 511 of the floor 51 on which the base 11 is mounted. The first rotation axis O1 is a rotation axis located on the most upstream side of the robot 1. The rotation around the first rotation axis O1 is achieved through driving of the first driving source 401 which is the first driving unit (driving unit) that includes a first motor 401M and a decelerator (not illustrated).

A rotatable angle of the first arm 12 is not particularly limited and is preferably set to be 90° or less. Thus, even when there is an obstacle around the robot 1, the robot 1 can operate easily avoiding the obstacle, and thus it is possible to shorten a cycle time.

Hereinafter, the first motor 401M and the second motor 402M, the third motor 403M, the fourth motor 404M, the fifth motor 405M, and the sixth motor 406M to be described below are each also referred to as a "motor".

The first arm 12 and the second arm 13 are connected via a joint 172. The joint 172 has a mechanism that supports one of the first arm 12 and the second arm 13 to be rotatable with respect to the other. Thus, the second arm 13 is rotatable about the second rotation axis O2 (around the second rotation axis O2) extending in (following) the horizontal direction with respect to the first arm 12. The second rotation axis O2 and the first rotation axis O1 are at skew positions and the second rotation axis O2 is parallel to a axis orthogonal to (intersecting) the first rotation axis O1. That is, as illustrated in FIG. 3, the second rotation axis O2 is separate from the first rotation axis O1 by a distance DO when viewed in the axis direction of the second rotation axis O2. The rotation around the second rotation axis O2 is achieved through driving of the second driving source 402 which is the second driving unit (driving unit) that includes a second motor 402M and a decelerator (not illustrated).

The second arm 13 and the third arm 14 are connected via a joint 173. The joint 173 has a mechanism that supports one of the second arm 13 and the third arm 14 to be rotatable with respect to the other. Thus, the third arm 14 is rotatable about the third rotation axis O3 (around the third rotation axis O3) extending in the horizontal direction with respect to the second arm 13. The third rotation axis O3 is parallel to the second rotation axis O2. The rotation around the third rotation axis O3 is achieved through driving of the third driving source 403 which is the third driving unit (driving unit) that includes a third motor 403M and a decelerator (not illustrated).

The third arm 14 and the fourth arm 15 are connected via a joint 174. The joint 174 has a mechanism that supports one of the third arm 14 and the fourth arm 15 to be rotatable with respect to the other. Thus, the fourth arm 15 is rotatable about the fourth rotation axis O4 (around the fourth rotation axis O4) with respect to the third arm 14 (the base 11). The fourth rotation axis O4 is orthogonal to (intersects) the third rotation axis O3. The rotation around the fourth rotation axis O4 is achieved through driving of the fourth driving source 404 which is the fourth driving unit (driving unit) that includes a fourth motor 404M and a decelerator (not illustrated).

The fourth rotation axis O4 may be parallel to a axis orthogonal to (intersecting) the third rotation axis O3. That is, the axis directions of the fourth rotation axis O4 and the third rotation axis O3 may be different from each other.

The fourth arm 15 and the fifth arm 16 are connected via a joint 175. The joint 175 has a mechanism that supports one of the fourth arm 15 and the fifth arm 16 to be rotatable with respect to the other. Thus, the fifth arm 16 is rotatable about the fifth rotation axis O5 (around the fifth rotation axis O5) with respect to the fourth arm 15. The fifth rotation axis O5 is orthogonal to (intersects) the fourth rotation axis O4. The rotation around the fifth rotation axis O5 is achieved through driving of the fifth driving source 405 which is the fifth driving unit (driving unit). The fifth driving source 405 includes a fifth motor 405M, a decelerator (not illustrated), a first pulley (not illustrated) connected to a axis of the fifth motor 405M, a second pulley (not illustrated) disposed to be separated from the first pulley and connected to a axis of the decelerator, and a belt (not illustrated) stretched over the first and second pulleys.

The fifth rotation axis O5 may be parallel to a axis orthogonal to (intersecting) the fourth rotation axis O4. That is, the axis directions of the fifth rotation axis O5 and the fourth rotation axis O4 may be different from each other.

The fifth arm 16 and the sixth arm 17 are connected via a joint 176. The joint 176 has a mechanism that supports one of the fifth arm 16 and the sixth arm 17 to be rotatable with respect to the other. Thus, the sixth arm 17 is rotatable about the sixth rotation axis O6 (around the sixth rotation axis O6) with respect to the fifth arm 16. The sixth rotation axis O6 is orthogonal to (intersects) the fifth rotation axis O5. The rotation around the sixth rotation axis O6 is achieved through driving of the sixth driving source 406 which is the sixth driving unit (driving unit) that includes a sixth motor 406M and a decelerator (not illustrated).

The sixth rotation axis O6 may be parallel to a axis orthogonal to (intersecting) the fifth rotation axis O5. That is, the axis directions of the sixth rotation axis O6 and the fifth rotation axis O5 may be different from each other.

In each of the driving sources 401 to 406, the decelerator may be omitted. In each of the arms 12 to 17, a brake (braking device) that brakes each of the arms 12 to 17 may be installed or may be omitted.

The motors 401M to 406M are not particularly limited. For example, a servo motor such as an AC servo motor or a DC servo motor may be exemplified.

Each brake is not particularly limited. For example, an electromagnetic brake can be exemplified.

In the motors 401M to 406M or each decelerator of the driving sources 401 to 406, a first encoder may be installed as a first position detector that detects a position of the first arm 12, a second encoder may be installed as a second position detector that detects a position of the second arm 13, a third encoder may be installed as a third position detector that detects a position of the third arm 14, a fourth encoder may be installed as a fourth position detector that detects a position of the fourth arm 15, a fifth encoder may be installed as a fifth position detector that detects a position of the fifth arm 16, and a sixth encoder may be installed as a sixth position detector that detects a position of the sixth arm 17 (none of the encoders is illustrated). The encoders detect rotational angles of the rotation axes of the motors 401M to 406M or each decelerator of the driving sources 401 to 406.

The configuration of the robot 1 has been described in brief.

Next, a relation among the first arm 12 to the sixth arm 17 will be described from various viewpoints while changing expressions or the like. The third arm 14 to the sixth arm 17 are assumed to straightly extend, that is, extend longest, in other words, in a state in which the fourth rotation axis O4 and the sixth rotation axis O6 match or are parallel to each other.

First, as illustrated in FIG. 5, a length L1 of the first arm 12 (arm length) is longer than a length L2 of the second arm 13. Thus, as illustrated in FIG. 6, the first arm 12 and the second arm 13 overlap easily when viewed in the axis direction of the second rotation axis O2.

Here, the length L1 of the first arm 12 is a distance between the second rotation axis O2 and a central line 621 extending in the right and left directions of a bearing 62 supporting the first arm 12 to be rotatable in FIG. 5 when viewed in the axis direction of the second rotation axis O2.

As described above, the length L2 of the second arm 13 is a distance between the second rotation axis O2 and the distal end of the second arm 13 when viewed in the axis direction of the second rotation axis O2.

As illustrated in FIG. 6, an angle θ (see FIG. 5) formed by the first arm 12 (the first rotation axis O1) and the second arm 13 can be 0° when viewed in the axis direction of the second rotation axis O2. In other words, the first arm 12 and the second arm 13 are overlapable, that is, the first arm 12 and the second arm 13 overlap each other, when viewed in the axis direction of the second rotation axis O2. Thus, when the distal end of the robot arm 6 is moved to a position different by 180° around the first rotation axis O1, a space for non-interference in the robot 1 can be set to be small.

The second arm 13 does not interfere in the first portion 121 of the first arm 12 when the angle θ is 0°, that is, when the first arm 12 and the second arm 13 overlap each other when viewed in the axis direction of the second rotation axis O2.

Here, the angle θ formed by the first arm 12 and the second arm 13 is an angle formed by a straight line 61 passing through the second rotation axis O2 and the third rotation axis O3 (a central axis of the second arm 13 when viewed in the axis direction of the second rotation axis O2) and the first rotation axis O1 when viewed in the axis direction of the second rotation axis O2.

By rotating the second arm 13 without rotating the first arm 12, it is possible to move the distal end of the second arm 13 (the distal end of the robot arm 6 (the distal end of the sixth arm 17)) to a position different by 180° around the first rotation axis O1 through a state in which the angle θ becomes 0° (the first arm 12 and the second arm 13 overlap each other) when viewed in the axis direction of the second rotation axis O2. Each of the third arm 14 to the sixth arm 17 is rotated as necessary.

When the distal end of the second arm 13 is moved to the position different by 180° around the first rotation axis O1 (when the distal end of the robot arm 6 is moved to the position different by 180° around the first rotation axis O1), the distal end of the second arm 13 and the distal end of the robot arm 6 are moved straightly when viewed in the axis direction of the first rotation axis O1.

A total length (maximum length) L3 of the third arm 14 to the sixth arm 17 is set to be longer than the length L2 of the second arm 13.

Thus, the distal ends of the second arm 13 to the sixth arm 17 can be projected when the second arm 13 and the third arm 14 overlap each other when viewed in the axis direction of the second rotation axis O2. Thus, it is possible to prevent the hand from interfering in the first arm 12 and the second arm 13.

Here, the total length (maximum length) L3 of the third arm 14 to the sixth arm 17 is a distance between the third rotation axis O3 and the distal end of the sixth arm 17 when viewed in the axis direction of the second rotation axis O2 (see FIG. 5). In this case, the third arm 14 to the sixth arm 17 are in a state in which the fourth rotation axis O4 and the sixth rotation axis O6 match or are parallel to each other, as illustrated in FIG. 5.

As illustrated in FIG. 6, the second arm 13 and the third arm 14 are overlapable when viewed in the axis direction of the second rotation axis O2.

That is, the first arm 12, the second arm 13, and the third arm 14 are simultaneously overlapable when viewed in the axis direction of the second rotation axis O2.

In the robot 1, when the foregoing relation is satisfied, it is possible to move the distal end (the hand) of the sixth arm 17 to a position different by 180° around the first rotation axis O1 through the state in which the angle θ formed by the first arm 12 and the second arm 13 becomes 0° (the state in which the first arm 12 and the second arm 13 overlap each other) when viewed in the axis direction of the second rotation axis O2 by rotating the second arm 13 and the third arm 14 without rotating the first arm 12. Then, it is possible to effectively drive the robot 1 using this operation. The space installed not to interfere in the robot 1 can be set to be small. It is possible to obtain various advantages to be described later.

As illustrated in FIG. 3, the robot 1 can take an orientation (state) at which the second arm 13 and the third arm 14 overlap each other when viewed in the axis direction of the second rotation axis O2, and the straight line 61 passing through the second rotation axis O2 and the third rotation axis O3 is orthogonal to (intersects) the first rotation axis O1. The orientation of the robot 1 illustrated in FIG. 3 is a basic orientation of the robot 1.

The basic orientation of the robot 1 (the robot arm 6) refers to an orientation when the encoders installed in the first driving source 401 to the sixth driving source 406 driving the first arm 12 to the sixth arm 17 are all at the origins, that is, the first arm 12 to the sixth arm 17 are all at basic orientations.

The basic orientations of the first arm 12 to the sixth arm 17 refer to orientations at which the encoders installed in the driving sources driving these arms are at the origins.

At the basic orientation of the second arm 13 (the (n+1)-th arm), the second arm 13 (the (n+1)-th arm) is orthogonal to (intersects) the first rotation axis O1 (the n-th rotation axis) when viewed in the axis direction of the second rotation axis O2 (the (n+1)-th rotation axis). That is, the straight line 61 passing through the second rotation axis O2 and the third rotation axis O3 is orthogonal to the first rotation axis O1 when viewed in the axis direction of the second rotation axis O2. In other words, the straight line 61 extends in the horizontal direction. Thus, by rotating the second arm 13 in the forward direction or the backward direction centering on the basic orientation, for example, it is possible to quickly perform work between the side surface and the installation surface of the robot 1 such as between the side surface and a floor 51.

The basic orientation of the robot 1 may be changeable or may be unchangeable.

In the robot 1, as described above, the first rotation axis O1 and the second rotation axis O2 are at skew positions and the second rotation axis O2 is parallel to a axis orthogonal to (intersecting) the first rotation axis O1. That is, as illustrated in FIG. 3, the second rotation axis O2 is separate from the first rotation axis O1 by a distance D0 (a separate distance) when viewed in the axis direction of the second rotation axis O2. Therefore, it is possible to easily access the side of the robot 1 and the installation surface side of the robot 1 (the side of the base 11). Therefore, the robot 1 can be used for diverse kinds of work according to uses, purposes, or the like.

Here, at the basic orientation illustrated in FIG. 3, that is, the basic orientation of the second arm 13, a distance Dl between the first rotation axis O1 (the n-th rotation axis) and the base end of the second arm 13 (the (n+1)-th arm) when viewed in the axis direction of the second rotation axis O2 (the (n+1)-th rotation axis) is not particularly limited and is appropriately set according to all the conditions. The distance D1 is preferably equal to or greater than 35% and equal to or less than 45% of the length L4 of the second portion 122 of the first arm 12. Thus, it is possible to easily access the side of the robot 1 and the installation surface side of the robot 1. However, when the distance D1 is less than the lower limit, it is difficult to access the side of the robot 1 and the installation surface side of the robot 1 depending on other conditions. When the distance D1 is greater than the upper limit, there is a concern of the rigidity of the first arm 12 deteriorating depending on other conditions.

As described above, the length L4 of the second portion 122 of the first arm 12 is a distance between the second rotation axis O2 and the boundary A of the second portion 122 and the planar portion 1211 of the first portion when viewed in the axis direction of the second rotation axis O2.

The length L2 of the second arm 13 is preferably equal to or less than 80% and equal to or less than 78% of the length L4 of the second portion 122 of the first arm 12 when viewed in the axis direction of the second rotation axis O2. Thus, it is possible to suppress interference of the third arm 14 to the sixth arm 17 which are the arms at the distal end side from the second arm 13 of the robot arm 6 or the hand (not illustrated) in the first portion 121 of the first arm 12. However, when the length L2 of the second arm 13 is longer than the upper limit, there is a concern of the third arm 14 to the sixth arm 17 or the hand interfering in the first portion 121 of the first arm 12.

The length L2 of the second arm 13 (the (n+1)-th arm) is preferably equal to or greater than 60% of the length L4 of the second portion 122 of the first arm 12 and is preferably equal to or greater than 70% of the length L4 when viewed in the axis direction of the second rotation axis O2 (the (n+1)-th rotation axis). Thus, the reach range of the robot arm 6 is narrowed, and thus it is possible to suppress difficulty of the access to the installation surface side of the robot 1. However, when the length L2 of the second arm 13 is shorter than the lower limit, it is difficult to access the side of the robot 1 and the installation surface side of the robot 1 depending on other conditions.

When the robot 1 has the above-described configuration, an orientation illustrated in FIG. 8 can be changed to an orientation illustrated in FIG. 10, that is, an orientation at which the third arm is located on the first portion 121 of the first arm 12, through an orientation illustrated in FIG. 9 without interference of the third arm 14 to the sixth arm 17 in the first portion 121 of the first arm 12 by rotating the second arm 13 and the third arm 14. Thus, the robot 1 can be caused to perform each operation without worrying about the interference of the third arm 14 to the sixth arm 17 in the first portion 121 of the first arm 12. In FIGS. 8 to 10, a circle 71 having a radius of the length L4 of the second portion 122 of the first arm 12 centering on the second rotation axis O2 and a circle 72 having a radius of the length L2 of the second arm 13 centering on the second rotation axis O2 when viewed in the axis direction of the second rotation axis O2 are indicated by one-dot chain lines.

As described above, in the robot 1, it is possible to easily access the side of the robot 1 and the installation surface side of the robot 1.

It is possible to suppress the interference of the third arm 14 to the sixth arm 17 which are the arms on the distal end side from the second arm 13 of the robot arm 6 or the hand in the first portion 121 of the first arm 12. Thus, necessity for providing an evacuation point is reduced and various kinds of works can be efficiently performed.

As described above, in the robot 1, it is possible to move the distal end of the robot arm 6 to the position different by 180° around the first rotation axis O1 through the state in which the angle θ formed by the first arm 12 and the second arm 13 becomes 0° (the state in which the first arm 12 and the second arm 13 overlap each other) when viewed in the axis direction of the second rotation axis O2 by rotating the second arm 13, the third arm 14, and the like without rotating the first arm 12.

Thus, the space for non-interference in the robot 1 can be set to be small.

That is, it is possible to set a movable region of the robot 1 in the width direction (a direction of a production line) to be small. Thus, it is possible to dispose many robots 1 along the production line per unit length, and thus shorten the production line.

When the distal end of the robot arm 6 is moved, a motion of the robot 1 can be reduced. For example, the first arm 12 can be configured not to be rotated or a rotatable angle of the first arm 12 can be set to be small. Thus, it is possible to shorten a cycle time and it is possible to improve work efficiency.

When an operation of moving the distal end of the robot arm 6 to the position different by 180° around the first rotation axis O1 (hereinafter also referred to as a "shortcut motion") is performed by simply rotating the first arm 12 around the first rotation axis O1 as in a robot of the related art, there is a concern of the robot 1 interfering in a nearby wall (not illustrated) or a peripheral device (not illustrated). Therefore, it is necessary to instruct the robot 1 in an evacuation point to avoid the interference. For example, when only the first arm 12 is rotated by 90° around the first rotation axis O1 and the robot 1 interferes in a wall, it is necessary to instruct the robot 1 in the evacuation point so that the robot 1 does not interfere in the wall by rotating the other arms. Similarly, when the robot 1 also interferes in a peripheral device, it is necessary to further instruct the robot 1 in the evacuation point so that the robot 1 does not interfere in the peripheral device. In this way, it is necessary to instruct a robot of the related art in many evacuation points. In particular, when a space around the robot 1 is small, a large number of evacuation points is necessary and much labor and a long time are necessary to instruct the robot 1.

However, when the shortcut motion is performed in the robot 1, the number of regions or portions in which there is a concern of interference is very small. Therefore, it is possible to reduce the number of evacuation points to be instructed, and thus it is possible to reduce the labor and the time necessary for the instruction. That is, in the robot 1, the number of evacuation points to be instructed is about ⅓ of the number of evacuation points in a robot of the related art, and thus it is considerably easy to give an instruction.

The right region (portion) of the third arm 14 and the fourth arm 15 in FIG. 1 are regions (portions) in which interference of the robot 1 in the robot 1 and other members does not occur or rarely occurs. Therefore, when a predetermined member is mounted on the region, the member rarely interferes in the robot 1, the peripheral device, and the like. Therefore, in the robot 1, a predetermined member can be mounted on the region. In particular, when the predetermined member is mounted on the right region of the third arm 14 in FIG. 1 among the regions, a probability that the member interferes in the peripheral device (not illustrated) disposed on a working table (not illustrated) is further lowered, and thus it is more effective to avoid the interference.

Examples of a member which can be mounted on the region include a hand, a control device controlling driving of a sensor such as a hand-eye camera, and an electromagnetic valve of an adsorption mechanism.

As a specific example, for example, when an adsorption mechanism is installed in the hand and the electromagnetic valve or the like is installed in the region, the electromagnetic valve does not interfere at the time of driving the robot 1. In this way, convenience of the region is high.

Second Embodiment

Figure 11:
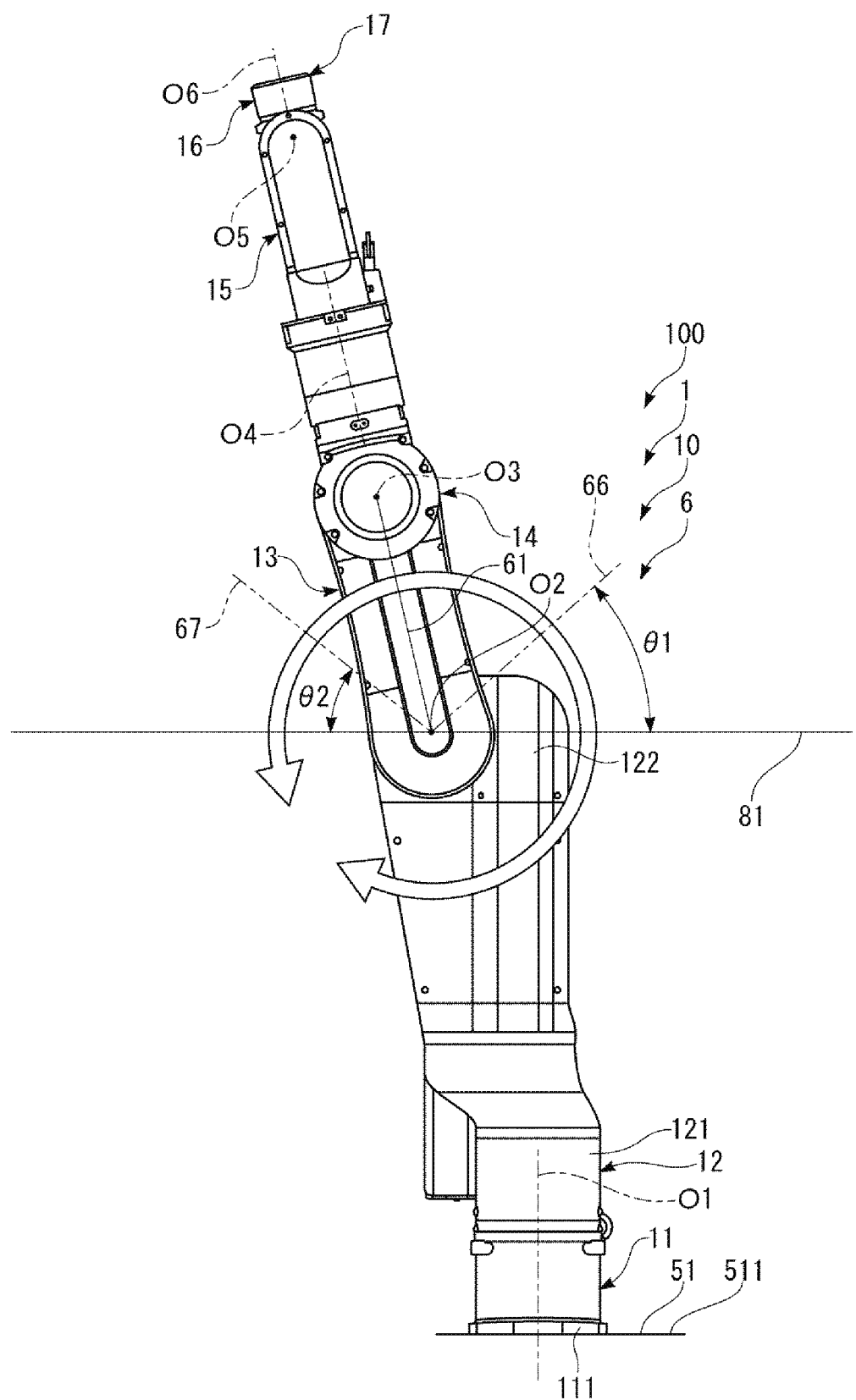
FIG. 11 is a front view illustrating a second embodiment of the robot according to the invention.

FIG. 11 is a front view illustrating a second embodiment of the robot according to the invention.

Hereinafter, the second embodiment will be described focusing on differences from the above-described embodiment and the description of the same factors will be omitted.

In the robot 1 (the robot system 100) according to the second embodiment, the basic orientation of the robot is changeable. That is, the basic orientation of the first arm 12 (the n-th arm) is changeable. The basic orientation of the second arm 13 (the (n+1)-th arm) is changeable. The basic orientation of the third arm 14 is changeable. The basic orientation of the fourth arm 15 is changeable. The basic orientation of the fifth arm 16 is changeable. The basic orientation of the sixth arm 17 is changeable. Thus, it is possible to change a range in which the distal end of the robot arm 6 can move quickly, and thus it is possible to deal with various uses.

In the robot 1, the basic orientation of the second arm 13 is not particularly limited. As illustrated in FIG. 11, a straight line 66 (a two-dot chain line is indicated so that the actual straight line 61 is not confused and matching is indicated by "66") passing through the second rotation axis O2 and the third rotation axis O3 when viewed in the axis direction of the second rotation axis O2 is set to be sloped by an angle θ1 to the installation surface of the robot 1 or its opposite side (the upper side in FIG. 11) with respect to a horizontal line 81 (the horizontal direction). The second arm 13 can be rotated by, for example, ±180° centering on the basic orientation. Thus, the distal end of the robot arm 6 can be moved at the shortest distance between a position higher than the horizontal line 81 of the side surface and a position lower the horizontal line 81.

The angle θ1 is not particularly limited and is appropriately set according to all the conditions. The angle θ1 is preferably equal to or greater than 10° and equal to or less than 80°, more preferably equal to or greater than 20° and equal to or less than 70°, and further more preferably equal to or greater than 30° and equal to or less than 60°. Thus, the distal end of the robot arm 6 can be moved at the shortest distance between the position higher than the horizontal line 81 of the side surface and the position lower the horizontal line 81.

As another example of the basic orientation of the second arm 13, as illustrated in FIG. 11, a straight line (a two-dot chain line is indicated so that the actual straight line 61 is not confused and matching is indicated by "67") passing through the second rotation axis O2 and the third rotation axis O3 when viewed in the axis direction of the second rotation axis O2 is set to be sloped by an angle θ2 to the installation surface side of the robot 1 or its opposite side (the upper side in FIG. 11) with respect to the horizontal line 81 (the horizontal direction). The second arm 13 can be rotated by, for example, ±180° centering on the basic orientation. Thus, the distal end of the robot arm 6 can be moved at the shortest distance between the position lower than the horizontal line 81 of the side surface and a ceiling.

The angle θ2 is not particularly limited and is appropriately set according to all the conditions. The angle θ2 is preferably equal to or greater than 10° and equal to or less than 80°, more preferably equal to or greater than 20° and equal to or less than 70°, and further more preferably equal to or greater than 30° and equal to or less than 60°. Thus, the distal end of the robot arm 6 can be moved at the shortest distance between the position lower than the horizontal line 81 of the side surface and ceiling.

Even according to the foregoing second embodiment, it is possible to obtain the same advantages as those of the above-described embodiment.

By setting the basic orientation of the second arm 13 according to a work position, it is possible to improve work efficiency.

The second embodiment can also be applied to a third embodiment.

Third Embodiment

Figure 12:
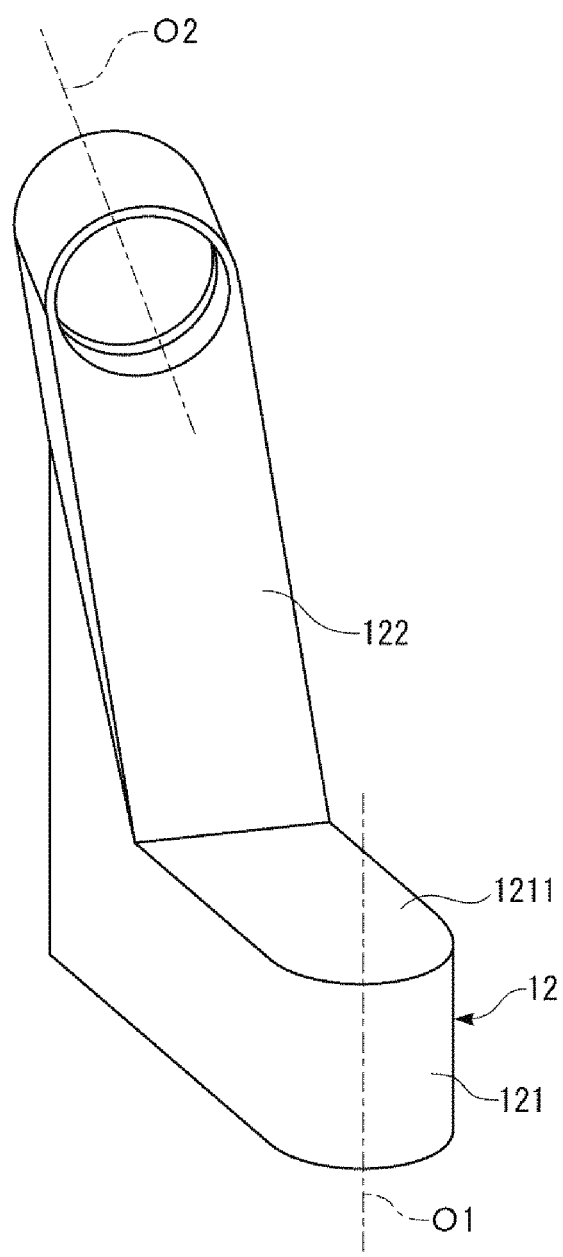
FIG. 12 is a perspective view schematically illustrating a first arm in a third embodiment of the robot according to the invention.
Figure 13:
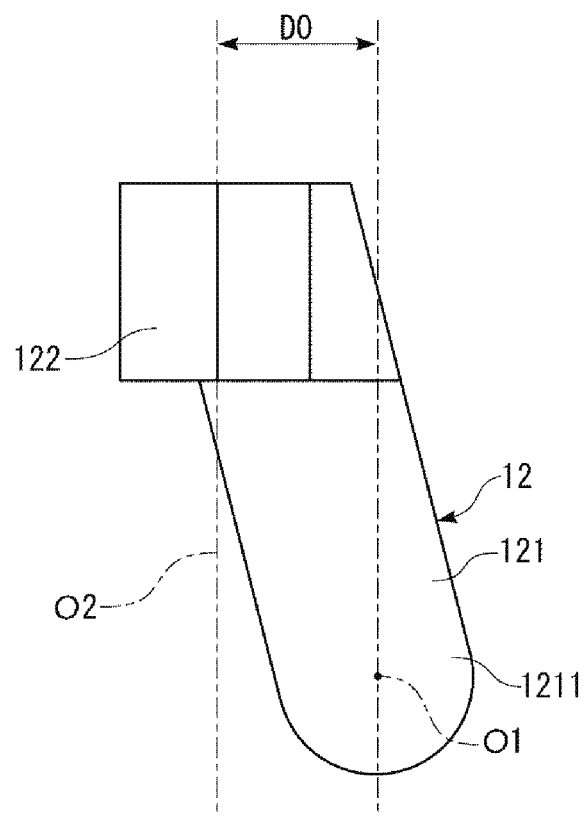
FIG. 13 is a plan view illustrating the first arm illustrated in FIG. 12.
Figure 14:
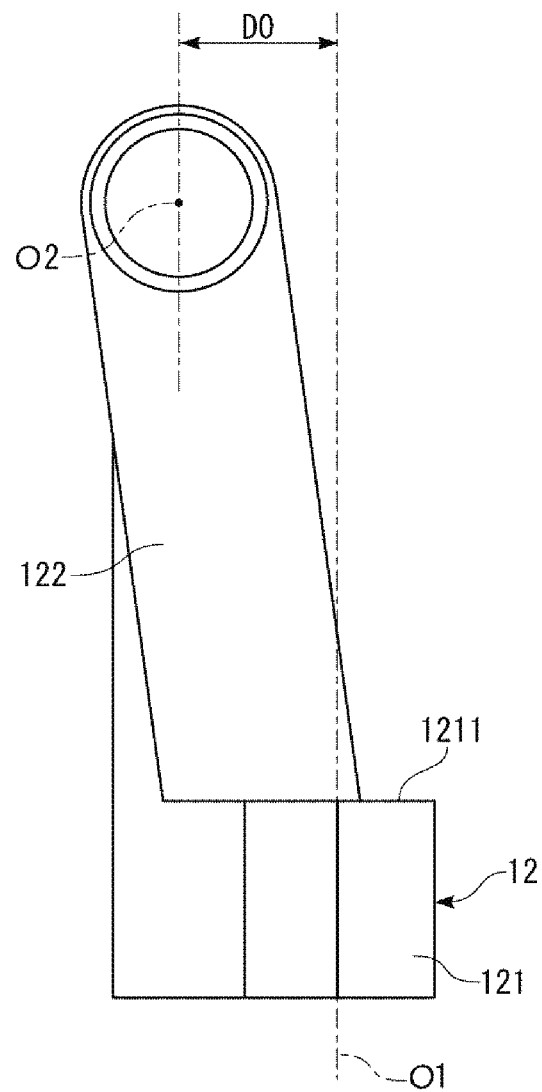
FIG. 14 a front view illustrating the first arm illustrated in FIG. 12.
Figure 15:
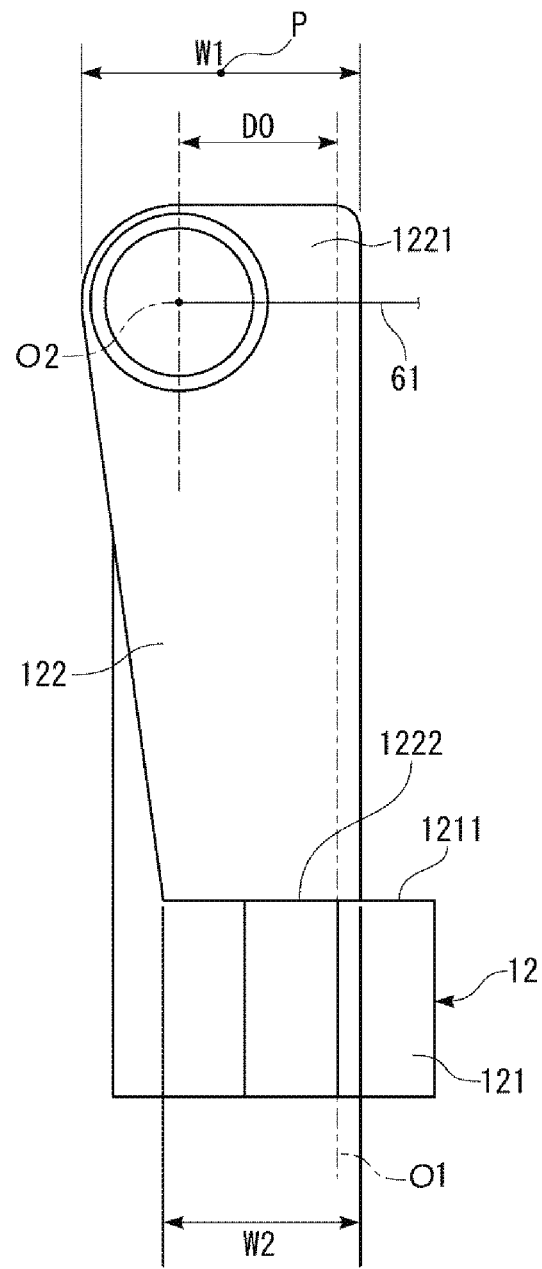
FIG. 15 is a front view schematically illustrating another configuration example of the first arm in the third embodiment of the robot according to the invention.

FIG. 12 is a perspective view schematically illustrating a first arm in the third embodiment of the robot according to the invention. FIG. 13 is a plan view illustrating the first arm illustrated in FIG. 12. FIG. 14 a front view illustrating the first arm illustrated in FIG. 12. FIG. 15 is a front view schematically illustrating another configuration example of the first arm in the third embodiment of the robot according to the invention.

Hereinafter, the third embodiment will be described focusing on differences from the above-described embodiment and the description of the same factors will be omitted.

At the basic orientation of the second arm 13, the straight line 61 passing through the second rotation axis O2 and the third rotation axis O3 is orthogonal to the first rotation axis O1 (see FIG. 3) and the second arm 13 can be rotated by, for example, ±180° centering on the basic orientation. In the robot 1 with this configuration, it is necessary to pass through a cable (not illustrated) in the direction of the straight line 61. Therefore, it is necessary to set the width of the distal end of the first arm 12 to be thick. In the first arm 12 with this shape, a moment of inertia around the first rotation axis O1 increases. Therefore, the dimensions (weight) of the first arm 12 are preferably decreased. Hereinafter, in the embodiment, the first arm 12 capable of decreasing the dimensions (weight) of the first arm 12 while ensuring necessary and sufficient rigidity will be described.

First, a case in which the width of the second portion 122 of the first arm 12 is almost constant when viewed in the axis direction of the second rotation axis O2 will be described.

In the robot 1 (the robot system 100) according to the third embodiment illustrated in FIGS. 12 to 14, as illustrated in FIG. 13, the first portion 121 of the first arm 12 is sloped to the second rotation axis O2 (the (n+1)-th rotation axis) when viewed in the axis direction of the first rotation axis O1 (the n-th rotation axis). Thus, the first rotation axis O1 can be separated from the second rotation axis O2 when viewed in the axis direction of the second rotation axis O2. It is possible to increase the rigidity of the first arm 12. That is, the dimensions (weight) of the first arm 12 can be decreased while maintaining the necessary and sufficient rigidity of the first arm 12.

The first portion 121 may be sloped at a constant slope angle or may be changed according to the length direction of the first portion 121. In the embodiment, the slope of the first portion 121 is constant.

As illustrated in FIG. 14, the second portion 122 of the first arm 12 is sloped to the opposite side to the first rotation axis O1 when viewed in the axis direction of the second rotation axis O2. Thus, the first rotation axis O1 can be separated from the second rotation axis O2 when viewed in the axis direction of the second rotation axis O2.

The second portion 122 may be sloped at a constant slope angle or may be changed according to the length direction of the second portion 122. In the embodiment, the slope of the second portion 122 is constant.

Next, a case in which the width of the second portion 122 of the first arm 12 is changed according to the length direction when viewed in the axis direction of the second rotation axis O2 will be described.

As illustrated in FIG. 15, a first width W1 of a portion 1221 opposite to the first portion 121 in the second portion 122 of the first arm 12 is longer than a second width W2 of a portion 1222 on the side of the first portion 121 in the second portion 122 when viewed in the axis direction of the second rotation axis O2 (the (n+1)-th rotation axis). Thus, a cable (not illustrated) can pass through the first arm 12 in the direction of the straight line 61.

When viewed in the axis direction of the second rotation axis O2 (the (n+1)-th rotation axis), the second rotation axis O2 (the (n+1)-th rotation axis) is located on a side (a separation side) on which the second rotation axis (the (n+1)-th rotation axis) is further separated from the first rotation axis O1 (the n-th rotation axis) than a central position P of the first width W1 of the second portion 122 of the first arm 12, that is, to the left side of FIG. 15. Thus, it is possible to easily access the side of the robot 1 and the installation surface side of the robot 1.

Even according to the foregoing third embodiment, it is possible to obtain the same advantages as those of the above-described embodiment.

The dimensions (weight) of the first arm 12 can be decreased while maintaining the necessary and sufficient rigidity of the first arm 12. Thus, it is possible to miniaturize the robot 1 and accordingly decrease a necessary installation space of the robot 1.

The robot according to the invention has been described above according to the illustrated embodiments, but the invention is not limited thereto. The configuration of each unit can be substituted with any configuration with the same function. Any of other constituents may be added. In the invention, two or more of the configurations (features) in the foregoing embodiments may be combined.

In the foregoing embodiments, a fixing location of the base of the robot is a floor in the installation space, but the invention is not limited thereto. In addition, for example, a ceiling, a wall, a working table, or the ground can be exemplified.

In the invention, the robot may be installed in a cell. In this case, examples of a fixing place of the base of the robot include a floor portion, a ceiling portion, and a wall portion of a cell, and a working table.

In the foregoing embodiments, a first surface which is a flat surface (surface) to which the robot (the base) is fixed is a flat surface (surface) parallel to the horizontal surface, but the invention is not limited thereto. For example, the first surface may be a flat surface (surface) sloped with respect to the horizontal surface or the vertical surface or may be a flat surface (surface) parallel to the vertical surface. That is, the first rotation axis may be sloped with respect to the vertical direction or the horizontal direction or may extend in the horizontal direction.

In the foregoing embodiments, the number of rotation axes of the robot arm included in the robot is 6, but the invention is not limited thereto. The number of rotation axes of the robot arm may be, for example, 2, 3, 4, 5, or 7 or more.

In the foregoing embodiments, the number of arms included in the robot is 6, but the invention is not limited thereto. The number of arms included in the robot may be, for example, 2, 3, 4, 5, or 7 or more. In this case, for example, in the robot according to the foregoing embodiments, an arm may be added between the second and third arms to realize the robot in which the robot arm includes seven arms.

In the foregoing embodiments, the number of robot arms included in the robot is 1, but the invention is not limited thereto. The number of robot arms included in the robot may be, for example, 2 or more. That is, the robot may be, for example, a multiple-arm robot such as a two-arm robot.

In the invention, the robot may be another type of robot. As a specific example, for example, a multiped walking (running) robot including legs may be exemplified.

In the foregoing embodiments, the case in which n 1 is in conditions (relations) of the n-th rotation axis, the n-th arm, the (n+1)-th rotation axis, and the (n+1)-th arm, that is, the case in which the conditions are satisfied in the first rotation axis, the first arm, the second rotation axis, and the second arm, has been described. However, the invention is not limited thereto. Here, n is at least one integer equal to or greater than 1 and the same conditions as those of the case in which n is 1 when n is any integer equal to or greater than 1 may be satisfied. Accordingly, for example, the same conditions as those of a case in which n is 2, that is, a case in which n is 1 in the second rotation axis, the second arm, the third rotation axis, and the third arm, may be satisfied. The same conditions as those of a case in which n is 3, that is, a case in which n is 1 in the third rotation axis, the third arm, the fourth rotation axis, and the fourth arm, may be satisfied. The same conditions as those of a case in which n is 4, that is, a case in which n is 1 in the fourth rotation axis, the fourth arm, the fifth rotation axis, and the fifth arm, may be satisfied. The same conditions as those of a case in which n is 5, that is, a case in which n is 1 in the fifth rotation axis, the fifth arm, the sixth rotation axis, and the sixth arm, may be satisfied.

The entire disclosure of Japanese Patent Application No. 2017-094938, filed May 11, 2017 is expressly incorporated by reference herein.

What is claimed is:
1. A robot comprising:
a first arm that includes a first leg and a second leg, the second leg having a section extending in a direction different from a direction in which the first leg extends, the first arm being rotatable around a first rotation axis; and
a second arm rotatably connected to the first arm to be rotatable around a second rotation axis, the second rotation axis having an axis direction different from an axis direction of the first rotation axis, wherein the first arm overlaps the second arm when viewed in the axis direction of the second rotation axis, wherein the first rotation axis and the second rotation axis are offset from each other when viewed in the axis direction of the second rotation axis, wherein the second leg is located closer to the second arm than the first leg, and wherein the second leg has a second leg length and the second arm has a second arm length, the second arm length being a distance between the second rotation axis and an end of the second arm when viewed in the axis direction of the second rotation axis, the second leg length being a distance between the second rotation axis and a second-leg-side boundary of a planar plate on a top surface of the first leg at the first rotation axis when viewed in the axis direction of the second rotation axis, the second arm length being less than or equal to 80% of the second leg length when viewed in the axis direction of the second rotation axis, wherein a first width of a first portion of the second leg on a side opposite to the first leg is greater than a second width of a second portion of the second leg on a side adjacent to the first leg when viewed in the axis direction of the second rotation axis.

2. The robot according to claim 1,
wherein the length of the second arm is greater than or equal to 60% of the length of the second leg when viewed in the axis direction of the second rotation axis.

3. The robot according to claim 1,
wherein at a basic orientation of the second arm, a distance between the first rotation axis and a base end of the second arm is greater than or equal to 35% and less than or equal to 45% of the length of the second leg when viewed in the axis direction of the second rotation axis.

4. The robot according to claim 1,
wherein at a basic orientation of the second arm, the second arm intersects the first rotation axis when viewed in the axis direction of the second rotation axis.

5. The robot according to claim 1,
wherein a basic orientation of the second arm is changeable.

6. The robot according to claim 1,
wherein the first leg is sloped toward the second rotation axis when viewed in the axis direction of the first rotation axis.

7. A robot comprising:
a first arm that includes a first leg and a second leg, the second leg having a section extending in a direction different from a direction in which the first leg extends, the first arm being rotatable around a first rotation axis; and a second arm rotatably connected to the first arm to be rotatable around a second rotation axis, the second rotation axis having an axis direction different from an axis direction of the first rotation axis, wherein the first arm overlaps the second arm when viewed in the axis direction of the second rotation axis, wherein the first rotation axis and the second rotation axis are offset from each other when viewed in the axis direction of the second rotation axis, wherein the second leg is located closer to the second arm than the first leg, and wherein the second leg has a second leg length and the second arm has a second arm length, the second arm length being a distance between the second rotation axis and an end of the second arm when viewed in the axis direction of the second rotation axis, the second leg length being a distance between the second rotation axis and a second-leg-side boundary of a planar plate on a top surface of the first leg at the first rotation axis when viewed in the axis direction of the second rotation axis, the second arm length being less than or equal to 80% of the second leg length when viewed in the axis direction of the second rotation axis, wherein the second rotation axis is staggered to a side of the first rotation axis, such that the second rotation axis is separate from the first rotation axis and is offset from a central position of a first width of the second leg when viewed in the axis direction of the second rotation axis.

* * * * *